(12) United States Patent
Choo et al.

(10) Patent No.: US 6,674,271 B2
(45) Date of Patent: Jan. 6, 2004

(54) POWER SUPPLY CONTROL APPARATUS AND METHOD THEREOF

(75) Inventors: Jong-yang Choo, Seoul (KR); Joong-gi Kwon, Gyeonggi-do (KR); Jong-hwa Cho, Gyeonggi-do (KR); Han-chung Ryu, Gyeonggi-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 10/091,297

(22) Filed: Mar. 6, 2002

(65) Prior Publication Data

US 2002/0125867 A1 Sep. 12, 2002

(30) Foreign Application Priority Data

Mar. 9, 2001 (TW) ........................................ 2001-012241

(51) Int. Cl.[7] ............................ G05F 1/40; H02M 3/335
(52) U.S. Cl. ..................................... 323/282; 363/21.16
(58) Field of Search ................................ 323/282, 283, 323/285, 286, 287, 273, 371; 307/39, 64, 65, 66; 395/750, 575; 363/21.16, 95, 100, 56.1; 364/492, 493, 707

(56) References Cited

U.S. PATENT DOCUMENTS

| | | | |
|---|---|---|---|
| 5,408,668 A | * | 4/1995 | Tornai ........................ 395/750 |
| 5,483,464 A | * | 1/1996 | Song ......................... 364/492 |
| 5,499,184 A | * | 3/1996 | Squibb ....................... 363/100 |
| 5,636,109 A | * | 6/1997 | Carroll ........................ 363/97 |
| 5,771,162 A | * | 6/1998 | Kwon ......................... 363/56 |
| 5,834,857 A | * | 11/1998 | Abe et al. ..................... 307/66 |
| 5,917,716 A | * | 6/1999 | Cho ........................... 361/18 |
| 6,157,177 A | * | 12/2000 | Feldtkeller .................. 323/267 |

* cited by examiner

Primary Examiner—Rajnikant B. Patel
(74) Attorney, Agent, or Firm—Staas & Halsey LLP

(57) ABSTRACT

An apparatus for controlling power and reducing power consumption in a system including a switching mode power supply. (SMPS), and a method thereof. The apparatus includes a switch that is set to an ON state when a user contacts the switch, a detection portion connected in parallel with the switch and detecting whether a signal for requiring a predetermined operation is applied to the system from outside, and a power supply portion supplying the power to each part in a system when the switch is set to the ON state or the signal is input from the detection portion. The power supply portion terminates the power to each part in the system including the system controller when a power off signal is applied from the system controller when the switch is set to an OFF state and when signal is not input from the detection portion.

65 Claims, 3 Drawing Sheets

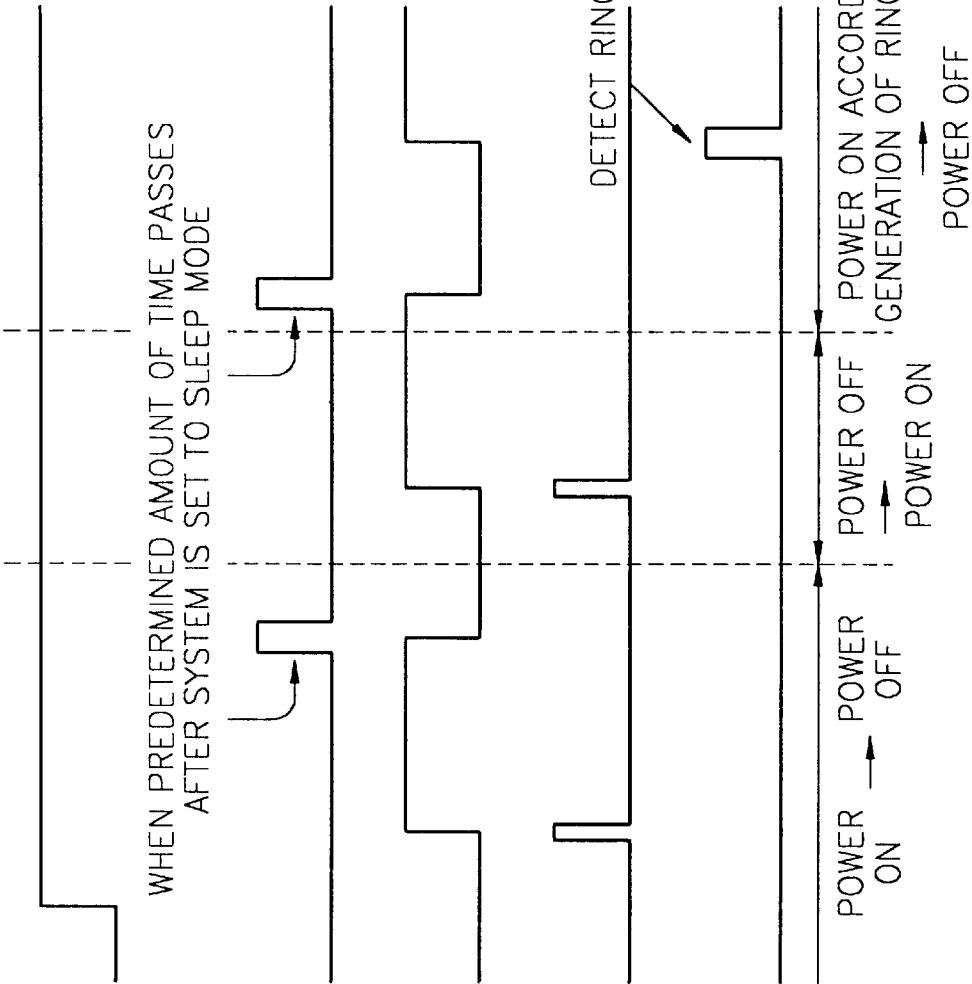

POWER SUPPLY CONTROL APPARATUS AND METHOD THEREOF

CROSS-REFERENCE TO RELATED APPLICATIONS

This application claims the benefit of Korean No. 2001-12241, filed Mar. 9, 2001, in the Korean Industrial Property office, the disclosure of which is incorporated herein by reference.

BACKGROUND OF THE INVENTION

1. Field of the Invention

The present invention relates to a system to which power is supplied using a switching mode power supply (SMPS), and more particularly, to a power supply control apparatus, which is capable of reducing power consumption by a SMPS in the system, such as a facsimile machine, for transmitting, receiving, and outputting data, and a method thereof.

2. Description of the Related Art

A switching mode power supply (SMPS) provides electric power to electric loads with a switching operation. A conventional SMPS, which is included in a system, such as a facsimile machine, for outputting data, is shown in FIG. 1. FIG. 1 illustrates an example in which power is supplied to a system controller (CPU) included in a system and peripherals from the SMPS included in the system.

Referring to FIG. 1, in the conventional SMPS, an alternating current (AC) voltage is changed into a direct current (DC) voltage by a rectifier circuit 101, and the DC voltage is transmitted to a driving voltage-applying portion 105 and a primary winding Np when an AC switch SW1 is turned on. In this case, a driving voltage Vcc is not applied to a pulse width modulation-integrated circuit PWM-IC 110, and thus power is induced in a primary winding Np. The driving voltage-applying portion 105 includes start up resistors R1 and R2, a capacitor C1, a resistor R3, and a diode D1 and supplies the driving voltage Vcc to the PWM-IC 110. That is, when the DC voltage is applied to the driving voltage-applying portion 105, the capacitor C1 is charged through the start up resistors R1 and R2. Due to the voltage in the capacitor C1, the driving voltage Vcc is supplied to a terminal P1 of the PWM-IC 110. As a result, the PWM-IC 110 outputs a signal for controlling a switching operation of a field-effect transistor (FET) through a terminal P3. An output switching control signal is applied to a gate terminal of the FET through a resistor R4. A resistor R5 is connected between the FET and a ground. When the FET is turned on, the primary winding Np in a transformer 115 allows the power to be induced in secondary windings Ns1 and Ns2 and in an auxiliary winding Na.

When the power is induced in the auxiliary winding Na of a transformer 115, the driving voltage Vcc is supplied to the PWM-IC 110 through the diode D1 and the resistor R3 in the driving voltage-applying portion 105. In a case where the FET is turned off and thus power is not induced in the auxiliary winding Na, the driving voltage Vcc is supplied to the PWM-IC 110 by the voltage charged in the capacitor C1.

As above, the power, which is induced in the auxiliary winding Na and the secondary windings Ns1 and Ns2, is determined in accordance with the switching operation of the FET. The switching operation of the FET is performed in accordance with a duty cycle, which is determined in the PWM-IC 110 according to a feedback signal provided from a feedback portion 120 through a terminal P4. The feedback portion 120 senses a voltage Vo1 output to the system controller (not shown) and provides a feedback signal to the terminal P4 of the PWM-IC 110 so that the output voltage Vo1 is maintained at a constant level. The PWM-IC 110 measures the peak value of current flowing into the FET through a terminal P2 and thereby prevents over-current from flowing into the FET. That is, in a case where it is recognized that the over-current flows into the FET in accordance with the measured peak value of the current, the PWM-IC 110 shuts down the FET.

Meanwhile, AC power induced in the secondary windings Ns1 and Ns2 is smoothed into a DC voltage by diodes D2 and D3 and capacitors C2, C3, C4, and C5, respectively, and thus is supplied to peripherals (not shown) and to the system controller.

However, when an AC switch SW1 is turned off, the SMPS shown in FIG. 1 stops working to supply the power to the peripherals and the system controller, as described above.

Likewise, the conventional SMPS continuously supplies power to the system controller and the peripherals in a case where the AC switch SW1 is not turned off. Thus, in order to reduce power consumption, the AC switch SW1 must be turned off when the system is not used. However, it is unknown when the output of data is required in the system, such as a fax machine, and thus the system always turns on the AC switch SW1. Thus, the power is continuously applied to the system controller and to the peripherals even when the system is not used, thereby unnecessarily consuming power.

To solve the problem, in the related art, a sleep mode has been suggested for cutting off power supplied from the SMPS to all of the peripherals of the system except the system controller in a case where it is recognized by the system controller that the system has not performed an operation for a predetermined period of time, has been suggested. However, even in a case where the sleep mode is set, the SMPS continuously supplies power to the controller, and the work for supplying power from the SMPS to the peripherals is continuously performed even though the power supply of the SMPS to the peripherals is cut off. Thus, even in a case where the sleep mode is set, power continues to be consumed in the SMPS.

SUMMARY OF THE INVENTION

To solve the above problems, it is a first object of the present invention to provide a power supply control apparatus, which controls the operation of a switching mode power supply (SMPS) so that power consumption in a system including the SMPS is reduced, and a method thereof.

It is a second object of the present invention to provide a power supply control apparatus, which controls to operate a SMPS only when power to a system is required, without a need for an alternating current (AC) switch, and a method thereof.

It is a third object of the present invention to provide a power supply control apparatus so that a system, such as a fax machine, is automatically turned on only when the output of data is required, and a method thereof.

Additional objects and advantageous of the invention will be set forth in part in the description which follows and, in part, will be obvious from the description, or may be learned by practice of the invention.

Accordingly, to achieve the above and other objects, according to the present invention, there is provided an apparatus for controlling power supply to each part in a system including a system controller and a data output device. The apparatus includes a switch that is set to an ON state by a user's contact, a detection portion which is connected in parallel with the switch and for detecting whether a signal for requiring a predetermined operation is applied to the system from outside, and a power supply portion for supplying power to each part of the system when the switch is temporarily set to the ON state or a second signal for indicating the detection of the signal is input from the detection portion, and for terminating the power supply to each part in the system including the system controller when a power off signal is applied from the system controller when the switch is set to an OFF state or when the second signal for indicating the detection of the signal is not input from the detection portion.

In order to achieve the above and other objects, according to the present invention, there is provided an apparatus for controlling power supply to a system having a system controller and peripherals requiring the power supply. The apparatus includes a switch that is controlled to turn on/off by a user, a first switching unit, a pulse width modulation (PWM) portion that supplies a pulse signal for controlling the switching operation of the first switching unit when a driving voltage is applied, a transformer that supplies power in accordance with the operation of the first switching unit, a driving voltage-applying portion which applies the driving voltage to the PWM portion when the switch is turned on, and a power-off signal detection portion which stops the operation of the PWM portion when a power off signal is detected. The system controller generates the power off signal when a predetermined period of time passes after power output from the transformer is applied, and then, a sleep mode is set.

The apparatus further includes a detection portion for detecting whether a signal for requiring a predetermined operation is applied to the system from outside, and the driving voltage-applying portion is connected to the detection portion so that the driving voltage is applied to the PWM portion when a second signal for indicating the detection of the signal from the detection portion is applied.

In order to achieve the above and other objects, according to the present invention, there is provided a method of controlling power supply in a system which supplies power output from a power supply function portion to a system controller and peripherals. The method includes controlling the power that is supplied to the peripherals and the system controller from the power supply function portion either when a switch that is set to an ON state if a user is in contact with the switch, or when a signal for requiring a predetermined operation is applied from outside the system, and controlling the power supply function portion to terminate the power supply to the peripherals and the system controller when a power off signal is generated from the system controller in the state where power is supplied to the peripherals and the system controller.

BRIEF DESCRIPTION OF THE DRAWINGS

These and other objects and advantages of the present invention will become more apparent and more readily appreciated from the following description of the preferred embodiment, taken in conjunction with the accompanying drawings of which:

FIGS. 3A through 3E are timing diagrams of the power supply control apparatus shown in FIG. 2.

DETAILED DESCRIPTION OF THE PREFERRED EMBODIMENTS

Figure 1:
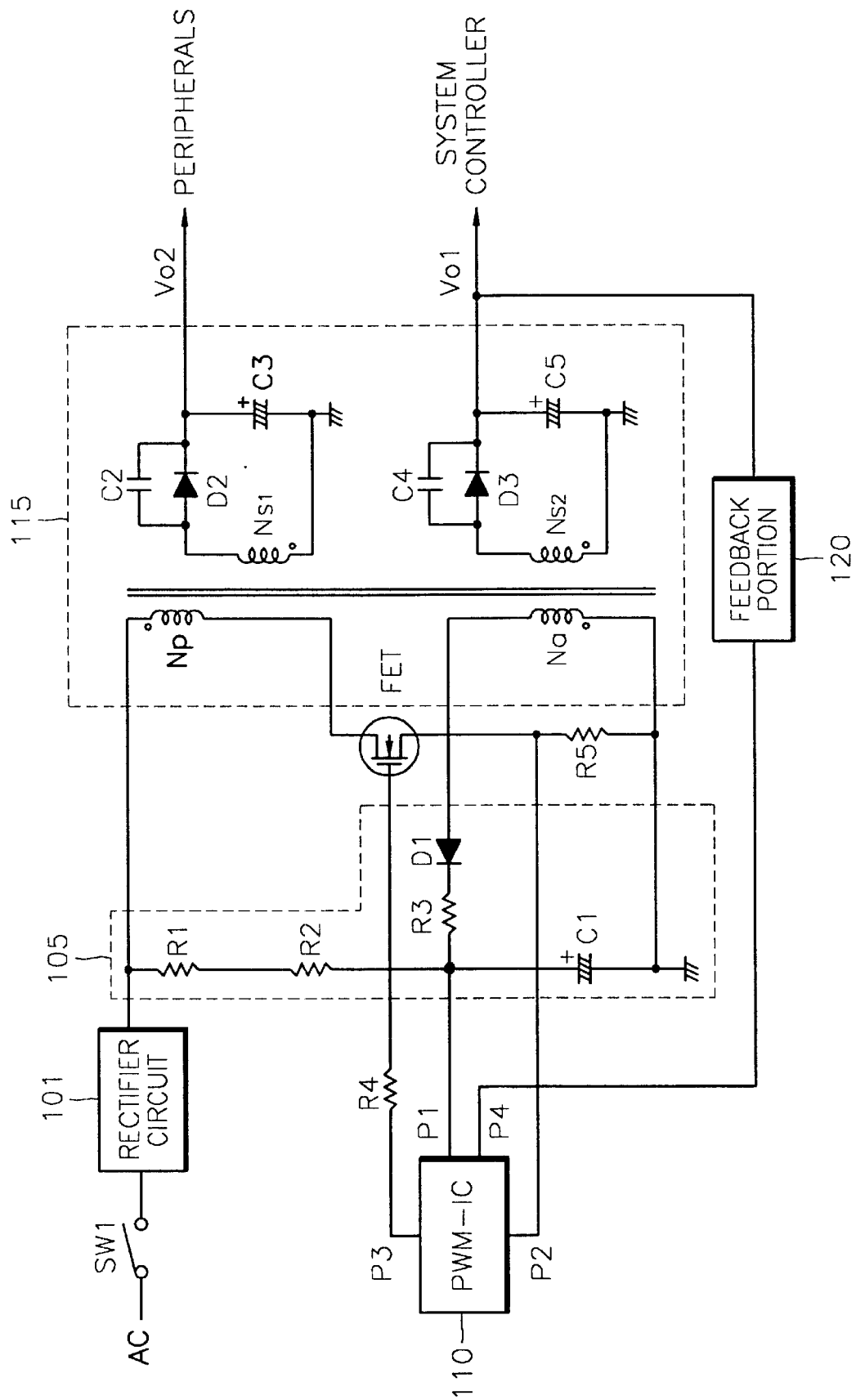
FIG. 1 is a circuit diagram of a conventional switching mode power supply (SMPS)

Reference will now be made in detail to the present preferred embodiments of the present invention, examples of which are illustrated in the accompanying drawings, wherein like reference numerals refer to the like elements throughout. The embodiments are described in order to explain the present invention by referring to the figures.

Figure 2:
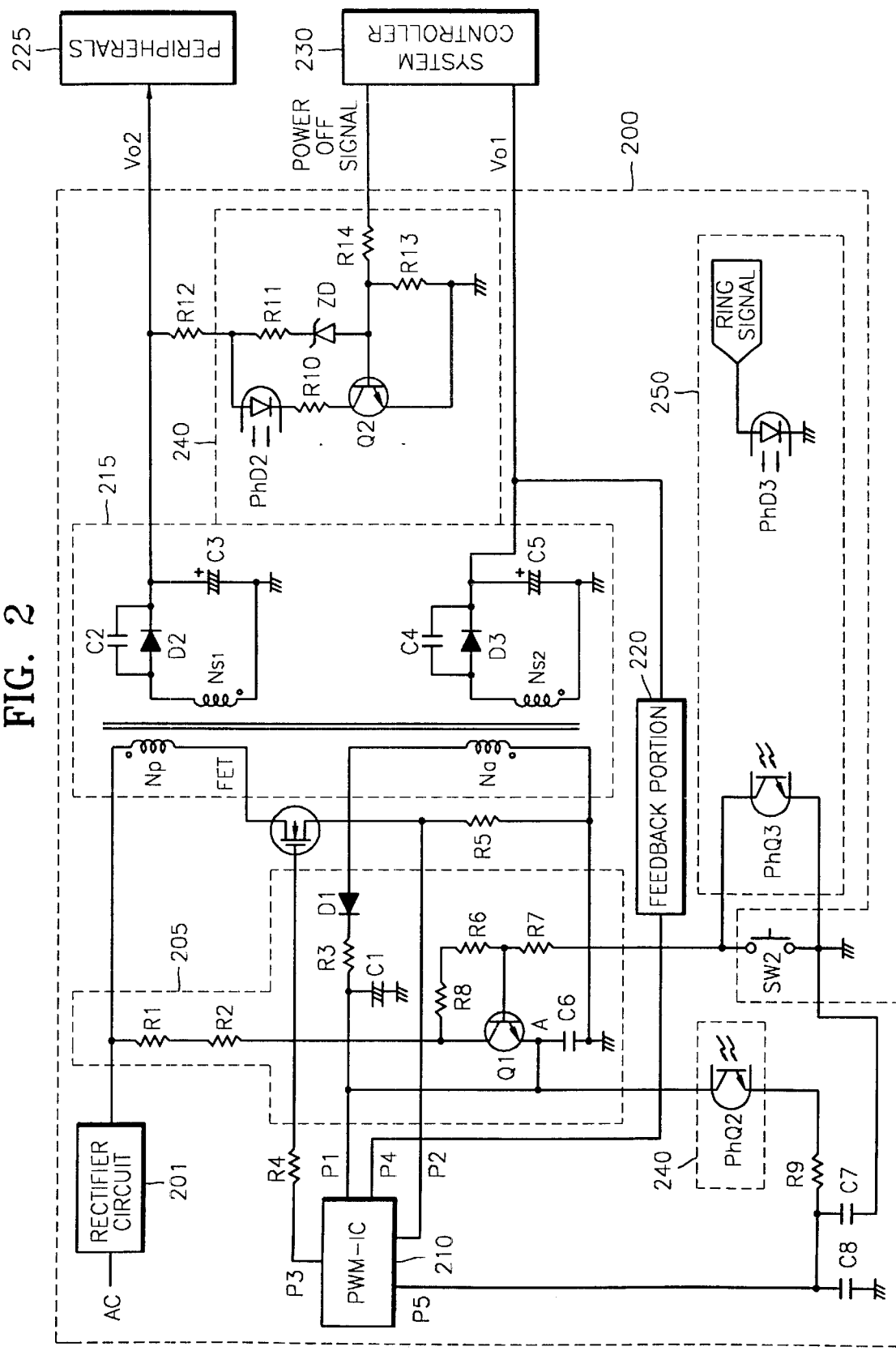
FIG. 2 is a detailed circuit diagram of a power supply control apparatus according to an embodiment of the present invention.

FIG. 2 is a detailed circuit diagram of a system including a power supply control apparatus according to an embodiment of the present invention and illustrates an example of the system, such as a facsimile machine or a printer, having a function of transmitting and receiving data through a telephone line or a network communication line.

Referring to FIG. 2, the system including a power supply control apparatus includes a switching mode power supply (SMPS) function portion 200, a switch SW2, peripherals 225, and a system controller 230. The SMPS function portion 200 includes a rectifier circuit 201, a driving voltage-applying portion 205, a transformer 215, a pulse width modulation-integrated circuit PWM-IC 210, a field-effect transistor (FET) corresponding to a switching unit, a feedback portion 220, a power-off signal detection and overvoltage prevention portion 240, a ring signal detection portion 250 connected to an external telephone line or a network system, resistors R4 and R9, and capacitors C7 and C8.

The ON/OFF state of the switch SW2 is controlled by a user. The switch SW2 has the same structure as that of a tact switch. Thus, the switch SW2 is set to the ON-state only when the user contacts the switch SW2 by pressing the switch SW2, and the switch SW2 is set to the OFF state in a case where the user does not contact the switch SW2 by releasing the switch SW2.

The rectifier circuit 201 rectifies an alternating current (AC) voltage when the AC voltage is applied to the rectifier circuit 201, and outputs a direct current (DC) voltage, as explained with regard to the rectifier circuit 101 shown in FIG. 1. The output DC voltage is transmitted to the driving voltage-applying portion 205 and the transformer 215. However, in this case, a driving voltage Vcc is not applied to the PWM-IC 210, and thus the FET is in an OFF state, and power is not induced in the transformer 215. Thus, even though the AC voltage is applied to the SMPS function portion 200, the SMPS function portion 200 doesn't supply power to the system controller 230 and the peripherals 225. The peripherals 225 are elements in the system other than the system controller 230 and require the power supply to drive a motor.

The driving voltage-applying portion 205 comprises start up resistors R1, R2, R3, R6, R7, and R8, capacitors C1 and C6, and a NPN-type transistor Q1, and supplies the driving voltage (Vcc) to the PWM-IC 210. However, unlike the conventional SMPS of FIG. 1, when the switch SW2 is not turned on during start up, the driving voltage Vcc cannot be supplied to the PWM-IC 210. This is the reason the transistor Q1 is maintained in an OFF state when the switch SW2 is not turned on. As a result, the SMPS function portion 200 is in a power off mode.

In this way, in a case where the user presses the switch SW2 in the power off mode, the transistor Q1 is in a conductive state such that the DC voltage applied through the start up resistors R1 and R2 is supplied to a terminal P1 of the PWM-IC 210 through a contact point A between the transistor Q1 and the capacitor C6. As a result, the PWM-IC 210 outputs a switching control signal having a duty cycle to the FET through a terminal P3 in response to the driving voltage.

In a case where the FET is switched, power is induced in the secondary windings Ns1 and Ns2 and the auxiliary winding Na by current flowing through the primary winding Np of the transformer 215. As a result, the power induced through capacitors C2, C3, C4, and C5, and diodes D2 and D3, each coupled to the secondary windings Ns1 and Ns2, is smoothed and transmitted to the peripherals 225 and the system controller 230.

After that, even though the switch SW2 is not pressed by the user, as shown in FIG. 2, the driving voltage (Vcc) is supplied to the terminal P1 of the PWM-IC 210 by the power induced in the auxiliary winding Na and the voltage charged in the capacitor C1, and thus switching of the FET is controlled. In addition, as shown in FIG. 2, the PWM-IC 210 adjusts the duty cycle of the FET according to a feedback signal, which is transmitted from the feedback portion 220 to a terminal P4 of the PWM-IC 210.

In this manner, in a case where the power to the SMPS function portion 200 is turned on, and thus the power is applied to the system controller 230 and the peripherals 225, the system controller 230 checks whether the peripherals 225 of the system operate or not. As a result of checking, when a non-operating period during which the peripherals 225 don't operate exceeds a predetermined reference period of time, the system can be set to a sleep mode, and the system controller 230 outputs a power off signal with an active state. In an embodiment of the present invention, the active state means a high level.

As a result, the power-off signal detection and over-voltage prevention portion 240 detects the power off signal. The power-off signal detection and over-voltage prevention portion 240 includes a photocoupler having a photodiode PhD2 and a phototransistor PhQ2, a transistor Q2, resistors R10, R11, R13, and R14, and a Zener diode ZD. Thus, the power off signal with the high level is applied from the system controller 230, the transistor Q2 is in a conductive state, and thus the photodiode PhD2 emits light. As a result, the phototransistor PhQ2 becomes conductive, and thus the driving voltage Vcc applied to the terminal P1 is supplied to an ON/OFF control terminal P5 of the PWM-IC 210. In such a case, a certain level of an FET off signal, which is applied to the ON/OFF control terminal P5 of the PWM-IC 210 by the capacitor C7, becomes high. As a result, the PWM-IC 210 is turned off to be in the off state in response to the high level of the FET off signal, and thus the outputting of the switching control signal of the FET stops. Thus, the SMPS function portion 200 is in a power off state.

Likewise, the operation in which the SMPS function portion 200 is set to the power off mode after being set to a power on state will be more easily understood from intervals from "power on" to "power off" of the timing diagrams shown in FIGS. 3A through 3E.

That is, in a case where the switch SW2 is controlled to be in the ON state, as shown in FIG. 3D, in the state where AC power is applied to the SMPS function portion 200, as shown in FIG. 3A, the level of output voltages Vo1 and Vo2 transmitted from the SMPS function portion 200 to the peripherals 225 and the system controller 230 is changed from a low state into a high state, as shown in FIG. 3C. This means that the power is supplied to the peripherals 225 and the system controller 230. In this way, the system doesn't perform any operations after the power is supplied to the peripherals 225 and the system controller 230, and thus the system is set to the sleep mode, and when the duration of the sleep mode exceeds the predetermined reference period of time, the power off signal output from the system controller 230 is changed from a low level to the high level, as shown in FIG. 3B. As a result, as described above, the SMPS function portion 200 is in the power off mode, and thus the output voltages Vo1 and Vo2 output to the peripherals 225 and the system controller 230 are changed from the high level to the low level, as shown in FIG. 3C.

The above-mentioned power-off signal detection and over-voltage prevention portion 240 may be driven so as to prevent the over-voltage from being supplied to the peripherals 225 when the SMPS function portion 200 is in the power on mode. That is, in a case where the output voltage Vo2 is higher than a threshold voltage of the Zener diode ZD, the transistor Q2 becomes conductive, and thus the photodiode PhD2 emits the light. As a result, the phototransistor PhQ2 becomes conductive, and the PWM-IC 210 stops operation, as described above. Thus, the SMPS function portion 200 is set to the power off mode, and thus power supply to the peripherals 225 and the system controller 230 is cut off.

As described above, in a case where the user presses the switch SW2 so as to transmit arbitrary data in the state where the SMPS function portion 200 is set to the power off mode, like during start up, the SMPS function portion 200 drives and supplies the output voltages Vo1 and Vo2 to the peripherals 225 and the system controller 230, respectively.

That is, as shown from the intervals from "power on" to "power off" of the timing diagrams shown in FIGS. 3A through 3E, in a case where the switch SW2 is pressed by the user at a time shown in FIG. 3D, the output voltages Vo1 and Vo2 output from the SMPS function portion 200 are changed from the low level into the high level, as shown in FIG. 3C.

In a case where a predetermined period of time for setting the sleep mode passes after a related data receiving or outputting operation is completed and the system is set to the sleep mode, as shown in FIG. 3B, the power off signal is generated, and thus the SMPS function portion 200 is set to the power off mode, and the output voltages Vo1 and Vo2 output from the SMPS function portion 200 are changed into the low level, as shown in FIG. 3C.

In this manner, in a case where a ring signal is detected by a ring signal detection portion 250 in the state where the SMPS function portion 200 is set to the power off mode, the transistor Q1 of the driving voltage-applying portion 205 is in a conductive state, and thus, like during start up, the driving voltage (Vcc) is supplied to the PWM-IC 210. Thus, the SMPS function portion 200 is set to the power on mode and supplies power to the peripherals 225 and the system controller 230, and thereby performs the the data receiving operation.

The ring signal detection portion 250 includes a photocoupler having a photodiode PhD3 and a phototransistor PhQ3. The photodiode PhD3 may be included outside the SMPS function portion 200. For example, in a case where a line interface unit (LIU) (not shown) is included in the system, the photodiode PhD3 may be included in the LIU. The ring signal detection portion 250 connects the photodiode PhD3 to a ring signal-receiving portion (not shown) so that the ring signal transmitted through a tip/ring line is detected. The ring signal has characteristics of being transmitted by inducing voltage, and thus the ring signal may be received even when the power of the system is off.

As described above, as the ring signal is detected in the state where the SMPS function portion 200 is set to the power off mode, the process in which the SMPS function portion 200 is set to the power on mode will be more easily understood by referring to the interval from "power on according to the generation of the ring signal" to "power off" as shown in the timing diagrams of FIGS. 3A through 3E. That is, in a case where the ring signal is detected as show in FIG. 3E in the state where the SMPS function portion 200 is set to the power off mode after a predetermined period of time after being set to the sleep mode, the SMPS function portion 200 is set to the power on mode, and thus the output voltages Vo1 and Vo2 are changed from the low level to the high level.

The operation performed in a case where the ring signal is externally applied is explained in the above-mentioned embodiment; however, a signal (an arbitrary operation-requiring signal of a system externally applied) which can be detected using the same structure as that of the ring signal detection portion 250 in the state where the power of the system is off, may be applied to the embodiment. In addition, the transistors Q1, Q2, and Q3 mentioned in the embodiment are used as a switching unit.

According to the present invention, the power supply state of the SMPS in the system to which the power is supplied using the SMPS is adaptively controlled to be changed according to an operation state of the system, thereby reducing unnecessary power consumption and performing the power on/off of the SMPS without a need for an extra AC switch. There is no need to include an extra auxiliary power so as to detect a ring signal in the state where the power of the system is turned off.

In particular, in a case where data is not transmitted in a system, such as a fax machine, the essential power supply from the SMPS to the system controller and the peripherals stops, thereby reducing power consumption in the system.

While this invention has been particularly shown and described with reference to preferred embodiments thereof, it will be understood by those skilled in the art that various changes in form and details may be made therein without departing from the spirit and scope of the invention as defined by the appended claims.

Although a few preferred embodiments of the present invention have been shown and described, it would be appreciated by those skilled in the art that changes may be made in this embodiment without departing from the principles and sprit of the invention, the scope of which is defined in the claims and their equivalents.

What is claimed is:

1. An apparatus for controlling power to each part in a system including a system controller, comprising:
    a switch that is set to an ON state when a user contacts the switch;
    a detection portion connected in parallel with the switch and detecting whether a first signal for requiring a predetermined operation is applied to the system from outside; and
    a power supply portion supplying the power to each part of the system when the switch is set to the ON state or a second signal for indicating the detection of the first signal is input from the detection portion, and terminating the power to each part in the system including the system controller when a power off signal is applied from the system controller, or when the switch is set to an OFF state and when the second signal for indicating the detection of the first signal is not input from the detection portion.

2. The apparatus of claim 1, wherein the power supply portion comprises a switching mode power supply (SMPS) to be turned off so that the power is not induced in secondary windings and an auxiliary winding when the power off signal is generated.

3. The apparatus of claim 1, wherein the detection portion comprises a ring signal detection portion detecting a ring signal.

4. An apparatus for controlling power to a system controller and a peripheral of a system, comprising:
    a switch turned on/off by a user;
    a first switching unit;
    a pulse width modulation (PWM) portion supplying a pulse signal controlling a switching operation of the first switching unit when a driving voltage is applied;
    a transformer supplying the power in accordance with the switching operation of the first switching unit;
    a driving voltage-applying portion applying the driving voltage to the PWM portion when the switch is turned on; and
    a power-off signal detection portion terminating the switching operation of the PWM portion when a power off signal is detected, wherein the system controller generates the power off signal when a predetermined period of time passes after the power output from the transformer is applied and then, a sleep mode is set.

5. The apparatus of claim 4, wherein the driving voltage-applying portion and the transformer supply the power to the system controller and the peripherals before the power off signal is generated even though the switch is set to an OFF state after the driving voltage is applied.

6. The apparatus of claim 4, wherein the switch is turned on only when a user is in contact with the switch.

7. The apparatus of claim 4, wherein the driving voltage-applying portion comprises a path for the driving voltage to be transmitted to the PWM portion using power provided through the transformer after the second switching unit is in a conductive state in response to the switch being turned on.

8. The apparatus of claim 4, wherein the power off signal-detecting portion comprises a second switching unit being in a conductive state when the power off signal is applied, and a photocoupler controlling the PWM portion to terminate the switching operation when the second switching unit is in the conductive state.

9. The apparatus of claim 4, further comprising a detection portion detecting whether a first signal for requiring a predetermined operation is applied to the system from outside, wherein the driving voltage-applying portion is connected to the detection portion so that the driving voltage is applied to the PWM portion when a second signal indicating the detection of the first signal from the detection portion is applied to the driving voltage-applying portion.

10. The apparatus of claim 9, wherein the driving voltage-applying portion is connected to the detection portion so that the driving voltage is applied to the PWM portion when the first signal is detected regardless of the operation of the switch.

11. The apparatus of claim 9, wherein the signal is a ring signal.

12. A method of controlling power supply in a system which supplies power output from a power supply function portion to a system controller and peripherals, the method comprising:
    controlling power supply function portion to supply power to the peripherals and the system controller when a switch that is set to an ON state if a user is in contact with the switch is set to the ON state, or when a signal for requiring a predetermined operation is applied from outside to the system; and
    controlling the power supply function portion to terminate the power supply to the peripherals and the system controller when a power off signal is generated from the system controller in the state where the power is supplied to the peripherals and the system controller.

13. The method of claim 12, wherein the terminating of the power off signal is generated when a predetermined period of time passes after the system is set to a sleep mode.

14. The method of claim 12, wherein the signal for requiring a predetermined operation is a ring signal.

15. An apparatus for controlling power in a system for transmitting and receiving data through an external communication line, the system having a system controller, the apparatus comprising:

a switching mode power supply (SMPS) which:
starts switching power in a primary winding of a transformer to induce power in a secondary winding of the transformer to supply power to the system controller from the secondary winding in response to a first detection signal, and
stops the switching of the power in the primary winding to stop the supply of power to the system controller in response to a second detection signal;

a detecting portion which:
detects a first input signal representing an operation of the system other than an operation of the system controller to generate the first detection signal, and
detects a second input signal representing an operation of the system controller to generate the second detection signal;

a first switch, which supplies power to a first input of the SMPS to start the switching of the power in the primary winding in response to the first detection signal; and a second switch which supplies a voltage to a second input of the SMPS to stop the switching of the power in the primary winding in response to the second detection signal.

16. The apparatus of claim 15, wherein the data transmitting and receiving system is a facsimile, a printer, or a copy machine.

17. The apparatus of claim 15, wherein the operation of the system corresponds to a data transmitting or receiving operation.

18. The apparatus of claim 15, wherein the first input signal is transmitted through an external communication line coupled to the data transmitting and receiving system.

19. The apparatus of claim 15, wherein the first input signal is a ring signal transmitted through an external public telephone line coupled to the data transmitting and receiving system.

20. The apparatus of claim 15, wherein:
the apparatus further comprises a peripheral coupled to the secondary winding; and
the peripheral is supplied with the power induced to the secondary winding.

21. The apparatus of claim 20, wherein the SMPS further comprises:
a feedback portion which adjusts a duty cycle of the switching of the power in the primary winding to change the power induced to the secondary winding where a voltage supplied to the system controller is different from a reference value.

22. The apparatus of claim 15, wherein the detecting portion comprises:
a photodiode which is activated in response to the first input signal; and
a phototransistor which generates the first detection signal in response to the activated photodiode.

23. The apparatus of claim 22, further comprising a line interface unit, wherein the photodiode is included in the line interface unit.

24. The apparatus of claim 22, further comprising:
a ring signal receiving portion having a tip/ring line coupled to the photodiode, wherein the first input signal is transmitted through the tip/ring line as a ring signal.

25. The apparatus of claim 22, wherein the first switch further comprises a transistor, having a base terminal coupled to the photo transistor, a collector terminal and an emitter terminal, the transistor conducting between the collector terminal and the emitter terminal in response to the first detection signal to connect the first input of the SMPS to a predetermined power source.

26. The apparatus of claim 15, further comprising a third switch which generates the first detection signal independently of the detecting portion when the third switch is turned on.

27. The apparatus of claim 26, further comprising a diode which supplies power from the secondary winding of the transformer to the first input of the SMPS after the switching of the power in the primary is started.

28. The apparatus of claim 26, wherein the third switch is a tact switch.

29. The apparatus of claim 26, wherein the third switch is turned on only when the user contacts the third switch unit and turned off when the user ceases to contact the third switch.

30. The apparatus of claim 26, wherein:
the phototransistor has a collector terminal and an emitter terminal connected to first and second terminals of the third switch.

31. The apparatus of claim 15, further comprising:
a power off detection portion which generates the second detection signal when a voltage of the power induced to the secondary winding is different from a reference value or when a predetermined period of time passes after the system does not perform any operation thereby stopping the inducing of the power to the secondary winding.

32. The apparatus of claim 31, wherein the power off detection portion comprises:
a photodiode;
a voltage sensor which determines whether a voltage of the power induced in the secondary winding differs from a reference value;
a transistor which activates the photodiode in response to the determination of the voltage sensor or in response to a power off signal generated by the system controller; and
a photo transistor which generates the second detection signal in response to the activated photodiode.

33. The apparatus of claim 32, wherein:
the power off detection portion comprises a diode coupled between the transistor and the voltage of the power induced in the secondary winding; and
the transistor is turned on in response to a current flowing through the diode.

34. An apparatus for controlling power in a system for transmitting and receiving data through an external communication line, the system having a systems controller and at least one peripheral which operates from the controlled power, the apparatus comprising:
a switching mode power supply (SMPS) comprising:
a transformer having a primary winding and a secondary winding, a first end of the primary winding being directly connected to a source of DC power,
a first switch unit coupled to a second end of the primary winding and switching power in the primary winding of the transformer to induce power to the secondary winding in response to a pulse width modulated (PWM) signal, and a pulse width modulator which starts the PWM signal in response to a power on signal and stops the PWM signal in response to a power off signal;

a power on detecting portion which outputs the power on signal in response to an operation of a switch; and a power off detecting portion which outputs the power off signal in response to an output signal generated by circuitry operating from a voltage induced in the secondary winding.

35. The apparatus of claim 34, wherein the first switch unit comprises:

a pulse width modulation-integrated circuit (PWM-IC) which generates the PWM signal in response to power being applied to a power input of the PWM-IC;

a driving voltage-applying portion which applies the source of the DC power to the power input of the PWM-IC in response to the power on signal; and a transistor coupled between the second end of the primary winding and a predetermined voltage and coupled to the PWM-IC, the transistor tuning on and off in response to the PWM signal to induce the power to the secondary winding.

36. The apparatus of claim 35, wherein the driving voltage-applying portion comprises a transistor which applies the driving voltage to the PWM-IC in response to the power on signal.

37. The apparatus of claim 36, further comprising:

a feedback portion which generates a feed back signal when the power supplied to the secondary winding is greater than or less than a reference value; wherein:
the PWM-IC controls a duty cycle of the PWM signal in response to the feedback signal.

38. The apparatus of claim 34, wherein:

the power off detection portion generates the power off signal when a voltage induced to the secondary winding is greater than a reference value, or in response to a control signal output by the systems controller.

39. The apparatus of claim 34, further comprising:

a ring signal detection portion connected between the power on detecting portion and one of an external telephone line and a network system and which generates the power on signal in response to detecting a ring signal from the one of the external telephone line and the network system.

40. A power supply apparatus in a system having a system controller and a peripheral which receives and outputs data, the apparatus comprising:

a rectifier directly coupled to an external power source disposed outside the system and which supplies first DC power;

a switching mode power supply (SMPS) which converts the first DC power to second DC power, the SMPS comprising:

a transformer having a primary winding and a secondary winding, the primary winding having a first end connected to the first DC power and a second end, a switching element, connected to the second end of the primary winding, which switches a current in the primary winding of the transformer in response to a pulse width modulated waveform, to induce the second DC power in the secondary winding of the transformer, and a pulse width modulation (PWM) driver which outputs the pulse width modulated waveform in response to input power being supplied to the PWM driver;

a control circuit which supplies the input power to the PWM driver from the first DC power in response to a control voltage; and a switch which supplies the control voltage to the control circuit when the switch is actuated.

41. The apparatus of claim 40, further comprising a sustaining circuit which supplies the input power to the PWM driver from the second DC power.

42. The apparatus of claim 40, wherein the switch is a manual switch which is turned on when pressed by a user.

43. The apparatus of claim 40, wherein the switch is turned on when a user contacts the switch and turned off when the user does not contact the switch.

44. The apparatus of claim 43, wherein the SMPS continues to supply the second power regardless of on and off states of the switch after the switch is turned on and off.

45. The apparatus of claim 40, wherein the control circuit further comprises:

a transistor having a base terminal coupled to the switch and which connects the first power to the PWM driver in response to operation of the switch.

46. The apparatus of claim 40, wherein the switch is a photo transistor activated by a light beam generated from an external signal.

47. The apparatus of claim 45, wherein the switch is a tact switch actuated when a user contacts the tact switch and not actuated when the user does not contact the tact switch.

48. The apparatus of claim 45, further comprising:

a ring signal detection portion connected to one of an external telephone line and a network system, and which generates the light beam to activate the photo transistor in response to the external signal, wherein:
the external signal is provided by the one of the external telephone line and the network system.

49. The apparatus of claim 48, wherein the ring signal detection portion comprises a photodiode.

50. The apparatus of claim 40, wherein the rectifier is directly connected to the external power source.

51. A power supply apparatus in a system having a system controller, a peripheral receiving and outputting data, and a switching mode power supply (SMPS) having a primary winding and a secondary winding coupled to the system controller and the peripheral, the apparatus comprising:

a rectifier directly coupled to an external power source, coupled to a first end of the primary winding of the SMPS;

a start up switch generating a voltage signal; and a power off switch generating a power off signal in response to an output of the system controller; and a control circuit coupled to a second end of the primary winding, supplying power from the rectifier to the primary winding of the SMPS to turn on the SMPS and induce the power to the secondary winding in response to the voltage signal, and terminating the supplying of the power from the rectifier to the primary winding of the SMPS in response to the power off signal.

52. The apparatus of claim 51, wherein the start up switch comprises:

a user switch generating a user signal when a user turns on the user switch, wherein the start up switch generates the voltage signal in response to the user signal.

53. The apparatus of claim 51, wherein the start up switch comprises:

a ring switch generating a ring detecting signal when a ring signal is presented through a communication line coupled to the system, wherein the start up switch generates the voltage signal in response to the ring detecting signal.

54. The apparatus of claim 51, wherein the power off switch generates the power off signal either when the peripheral of the system does not operate for a first predetermined period of time or the power off switch does not generate the ring signal power off signal for a second predetermined period of time.

55. The apparatus of claim 51, wherein the SMPS comprises an auxiliary winding through which the voltage signal is generated when the power is supplied to the primary winding, wherein the control circuit continues to supply the power to the primary winding even when the start up switch does not generate the start up signal.

56. The apparatus of claim 55, wherein:
the power off switch is coupled between the auxiliary winding and the control circuit, and
the control circuit does not receive the voltage signal from the auxiliary winding after receipt of the power off signal, wherein the control circuit terminates the supplying of the power from the rectifier to the primary winding of the SMPS.

57. A power supply apparatus in a system having a system controller, a peripheral receiving and outputting data, comprising:
a rectifier adapted to be directly coupled to an external power source outside the system;
a switching mode power supply (SMPS) which supplies power to the system controller and the peripheral, the SMPS comprising:
a transformer having a primary winding and a secondary winding, the primary winding having a first end coupled to the rectifier and a second end, the secondary winding coupled to the system controller and the peripheral, and
a control circuit coupled to the secondary winding and coupled between the second end of the primary winding and a predetermined voltage, supplying the power from the rectifier to the primary winding to induce the power to the secondary winding when the control circuit is turned on;
a detector detecting a ring signal and generating a ring detecting signal; and
a switch coupled between the first end of the primary winding and the control circuit, generating a driving signal to turn on the control circuit in response to the ring detecting signal when the control circuit is turned off.

58. A method of controlling power in a power supply apparatus of a system having a system controller, a peripheral receiving and outputting data, a rectifier, and a switching mode power supply (SMPS) having a primary winding and a secondary winding, the method comprising:
generating a power on signal in response to a signal transmitted from outside the system;
supplying power from the rectifier to the primary winding of the SMPS and inducing the power to the secondary winding in response to the power on signal;
supplying power to the system controller and the peripheral from the power induced in the secondary winding; and
terminating the supplying of the power from the rectifier to the primary winding in response to a power off signal generated by the system controller.

59. The method of claim 58, further comprising:
detecting a ring signal transmitted outside the system and generating the power on signal in response to the detected ring signal.

60. The method of claim 59, further comprising:
generating the power off signal when the ring signal is not generated for a predetermined period of time.

61. The method of claim 58, further comprising:
generating a power off signal when the peripheral of the system does not operate for a predetermined period of time.

62. An apparatus for controlling power to a system having at least a system controller and a peripheral which receives and outputs data, the apparatus comprising:
a transformer having a primary winding connected to a source of DC power and first and second secondary windings;
a PWM driver which switches a current in the primary winding to transfer power to the first and second secondary windings in response to first power being applied to the PWM driver;
a user switch;
a first electronically operated switch which supplies the first power to the PWM driver from the source of DC power in response to a momentary operation of the user switch;
a first rectifier which supplies the first power to the PWM driver from the first secondary winding after the momentary operation of the user operated switch;
a second rectifier which supplies second power to the system controller from the second secondary winding;
a second electronically operated switch which conducts first power to a control terminal of the PWM driver, to stop the switching of the PWM driver in response to a momentary control signal generated by the system controller, thus stopping the supply of power to the PWM driver, the system controller and the peripheral.

63. The apparatus of claim 62, wherein:
the transformer further comprises a third secondary winding; and
the apparatus further comprises a third rectifier which supplies power to the peripheral from power induced in the third secondary winding.

64. The apparatus of claim 62, wherein:
the apparatus further comprises an overvoltage detection circuit coupled with at least one of the secondary windings; and
the second electronic switch conducts the first power to control terminal of the PWM driver, to stop the switching of the PWM driver in response the detection of an overvoltage.

65. The apparatus of claim 62, wherein:
the apparatus further comprises a third electronically operated switch connected in parallel with the user operated switch; and
the first electronically operated switch supplies the first power to the PWM driver from the source of DC power in response to a momentary operation of the third electronically operated switch.

* * * * *